Oct. 24, 1944.  H. N. BAUMANN, JR., ET AL  2,360,841
ALUMINOUS MATERIAL
Filed June 10, 1941
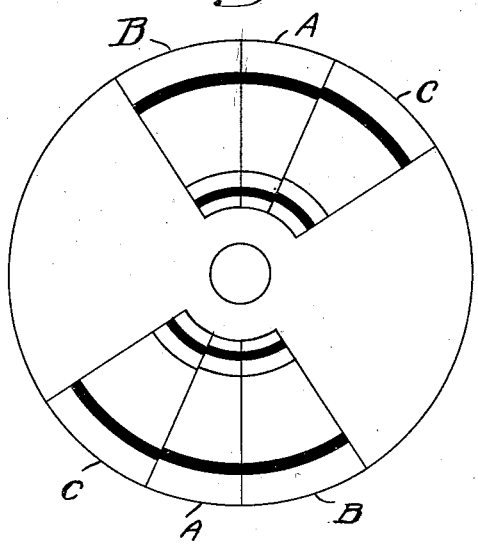
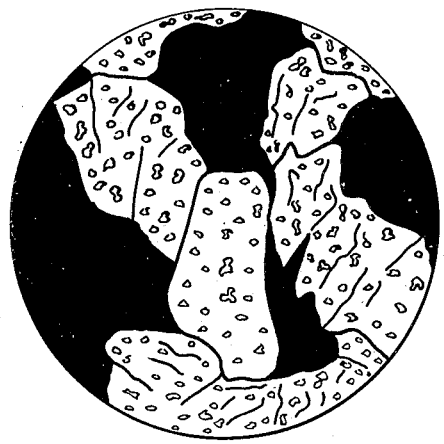
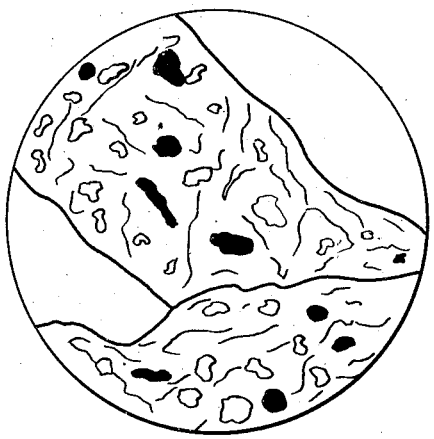
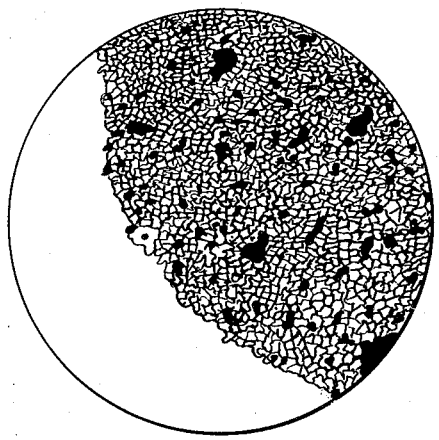
Inventors,
Henry N. Baumann Jr.,
Raymond C. Benner.
by
Attorney.

Patented Oct. 24, 1944

2,360,841

UNITED STATES PATENT OFFICE 2,360,841

ALUMINOUS MATERIAL

Henry N. Baumann, Jr., and Raymond C. Benner, Niagara Falls, N. Y., assignors to The Carborundum Company, Niagara Falls, N. Y., a corporation of Delaware Application June 10, 1941, Serial No. 397,490

12 Claims. (Cl. 51—309)

This application relates to products formed of sintered alumina which has been modified by other metallic oxides and methods of forming such products.

An object of the invention is to produce improved refractory and abrasive materials of this type.

An abrasive material has long been made commercially by fusing bauxite or other material having a high alumina content under reducing conditions in electric furnaces. Alumina of high technical purity such as that made by the Bayer process has also been fused to produce abrasive material. In both cases the abrasive is chiefly alpha alumina, a mineral crystallographically identical with the crystalline form of alumina found in nature as corundum. Particular abrasive characteristics of such forms of alpha alumina will vary somewhat depending upon the total alumina content, the amount and kind of associated impurities, and the rate of cooling of the sintered product. Under any conditions, however, such products have certain limitations as regards uniformity, toughness, microstructure, and the degree to which their physical properties may be altered to fit different abrasive applications.

The accompanying drawing explains and illustrates certain aspects of our invention. In the drawings, Figure 1 illustrates X-ray back reflection diffraction pattern photograms of powdered aluminous materials; Figure 2 shows the appearance of sintered alpha alumina under high magnification; Figure 3 shows the appearance, under high magnification, of the mass obtained by sintering together 90% of finely divided alumina and 10% $TiO_2$; and Figure 4 shows the appearance, under high magnification, of the mass obtained by sintering together 99% finely divided alumina and 1% of $V_2O_5$.

In our copending application, Serial No. 312,927, filed January 8, 1940, it has been disclosed that alumina may be modified by forming solid solutions with the sesquioxides of either chromium or vanadium or with both. The result of this modification is the production of alumina grain of considerably increased hardness.

In our copending application, Serial No. 357,947, filed September 23, 1940, it has been disclosed that alumina may also be modified by the formation of solid solutions with the alumina of ferric oxide, manganese sesquioxide, or mixtures of these two oxides with each other or with the sesquioxides of vanadium and chromium at temperatures well below the fusion or sintering temperatures of the alumina.

In application Serial No. 312,927 it is disclosed that chromium and vanaduim oxides will form solid solutions with alumina by fusion or by a sintering procedure. Unlike chromium and vanadium oxides however, manganese and iron sesquioxides, when completely fused with alumina (particularly under reducing conditions) tend to dissociate to a lower oxide state of the typical formula MeO and form aluminates rather than to enter into solid solution. When sintered with alumina however, iron and manganese oxides enter into solid solution in alumina to some extent at or somewhat below a temperature of 1800° C. This is shown by Figure 1 which is a representation of an X-ray photogram of back reflection diffraction powder patterns of three different materials. The first of these materials, the powder pattern of which is indicated in Figure 1 by A, is finely divided pure alpha alumina. The second material is a powder obtained by crushing a fusion of 90% alumina and 10% iron oxide ($Fe_2O_3$); the powder pattern of this material is identified in Figure 1 by B. The third material is a powder obtained by crushing the product formed by sintering together 90% alumina and 10% iron oxide; in Figure 1 the powder pattern of this material is indicated by C. The photogram shows that the diffraction lines of the iron oxide-alumina product formed by fusion, are not displaced from the position occupied by the characteristic lines of the pure alumina, thus indicating that in the fused product, no iron oxide entered into solid solution in the alumina. On the other hand the diffraction lines of the sintered iron oxide-alumina product are appreciably offset from the position of the characteristic lines of the pure alumina showing the presence of iron in the alpha alumina lattice.

Applicants have discovered that the amount of iron or manganese oxide which enters into solid solution in alumina during the sintering process is measurably increased if the oxide is mixed with titanium oxide. It has been further discovered that titanium oxide, presumably of the formula $Ti_2O_3$, will itself, enter into solid solution in alumina to give products having properties quite similar to those resulting from the formation of solid solutions of other metallic oxides, such as $Cr_2O_3$, $V_2O_3$ and $Mn_2O_3$, in alumina. Thus the resulting product, when titanium oxide and ferric oxide are used together, contains both oxides in solid solution.

The following examples illustrate the formation of and describe solid solutions of titanium oxide and mixtures of titanium oxide and ferric oxide in alumina.

Example I

When from 1-2% of finely divided titanium dioxide is mixed with 98-99% of finely divided alumina and the mixture is sintered to 1800° C. for about two hours, the crystals of the sintered mass, when observed under the petrographic microscope, have slightly different properties from those crystals formed by sintering finely divided alumina alone. Pure alumina crystals are colorless. The crystals in the sintered mass containing titanium oxide are in some instances slightly colored to a light pink and may be pleochroic to a reddish purple. The indices of refraction of the crystals in the sintered mass containing titanium oxide are also somewhat higher than the indices of refraction of pure alumina crystals. Thin sections of the mass of crystals in the sintered product show that the crystals are tightly interlocking and that very little titanium oxide remains as a residual material between the crystals. This fact indicates that probably at least 50% of the TiO$_2$ originally used entered in some manner into solid solution in the alumina and caused the difference in optical properties outlined above. At least through some means titanium atoms have entered the alumina lattice.

In preparing the above mixture of materials and other mixtures of alumina and metal oxides for sintering, a convenient method is to mix the powdered materials with water and a temporary binding medium such as dextrin to obtain a workable mass and press the mass under about 2000 psi to form a block or other desired shape. While 1800° C. is in general our preferred temperature, we have successfully sintered articles at both higher and lower temperatures, some as low as 1700° C. and others as high as 2000° C.

Example II

When 3% of finely divided ferric oxide is sintered with 97% of finely divided alumina at 1800° C. for about two hours, the crystals of the sintered product show a slight elevation in their indices of refraction over those of pure alumina crystals and are occasionally colored purple. Examination under the petrographic microscope reveals that at least ⅔ of the ferric oxide used remains as residual material between the crystals indicating that about 1% or less of ferric oxide has entered into solid solution in the alumina. When, however, 2% each of both ferric oxide and titanium oxide are mixed with 96% of alumina, all in finely divided form, and sintered in the manner set forth above, examination under the petrographic microscope reveals no residual intercrystalline material. It is also found that the indices of refraction of the crystals in the sintered mass are appreciably raised and many of the crystals are colored a deep purple indicating that both oxides have entered into solid solution in alumina, the ferric oxide in virtually twice the amount that it did when used without the titanium oxide.

Titanium oxide has also been found to increase the tendency of other oxides having the same valence and general structure as ferric oxide to enter into solid solution in alumina. Thus, for example, chromic oxide when admixed with titanium oxide and sintered with alumina enters into solid solution in the alumina in considerable amounts at temperatures much lower than it is possible to use in the absence of titanium oxide.

In the copending applications heretofore referred to it has been pointed out that the hardness and the toughness of the alumina may be improved by introducing oxides in solid solution in the alumina and methods are disclosed for varying these properties by suitable choices of oxides for modifying the alumina and by subsequent treatment.

We have also found that the grain or crystal size of sintered alumina masses can be varied and controlled by the use of certain oxides in the mixes to be sintered. Thus we have found that the addition of manganese oxide, ferric oxide and other related oxides such as chromium oxide and titanium oxide all of which have similar structures and the metals of which readily assume the trivalent state will, when sintered with alumina, increase the grain size of the crystals in the sintered mass over the size characteristic of pure alumina. Manganese oxide and titanium oxide in particular seem to serve as mineralizers, promoting the crystallization of the alumina.

We have found, on the other hand, that oxides not closely related to ferric oxide and manganese oxide in their general structure or in which the chief valence of the metal is not 3, such as MoO$_3$, ZrO$_2$, MgO and V$_2$O$_5$, tend to inhibit crystal growth during the sintering of mixtures of such oxides with alumina. Of these latter oxides, only V$_2$O$_5$ will, under sintering conditions, undergo a change to a form having a close structural relation to manganese oxide and ferric oxide.

We have discovered that vanadium oxide in amounts up to about 2% produces a finer grain size while in larger amounts it has little or no inhibiting effect upon the crystal growth. Other oxides of this growth-inhibiting group produce a refinement of grain size throughout the range of amounts in which they may usefully be added although the different oxides exhibit their optimum effect at different concentrations. Thus zirconium oxide in amounts from 4-5% is most effective while molybdenum oxide, though causing some refinement of grain size when present in low percentages, is especially effective in inhibiting crystal growth when used in amounts of from 8-10%.

Pure finely divided alumina when sintered to 1800° C. for two hours develops crystals which upon microscopic examination, prove to have an average diameter of .025-.030 mm. Figure II is taken from a photomicrograph (magnification 275X) of a portion of a sintered article of pure alumina.

The effect of zirconium oxide on the grain size of alumina bodies containing it is set forth in the following example:

Example III

In the body produced by sintering together 1-2% finely divided zirconium oxide and 98-99% finely divided alumina the individual crystals are found to have an average diameter of .01 mm.; in a sintered mass containing 4-5% of zirconium oxide the average diameter of the crystals is .006 mm. When used in larger amounts zirconium oxide produces less marked reduction in size of the crystals in the sintered mass.

The following example illustrates the effect of manganese and titanium oxides on the crystal size of the sintered mass of alumina containing these oxides.

Example IV

Masses resulting from the sintering together of .5-1% of finely divided manganese oxide or titanium oxide and 99-99.5% of finely divided alumina at 1800° C. for two hours show an average crystal diameter considerably greater than that diameter (.025-.030 mm.) characteristic of pure sintered alumina. In the case of manganese oxide, an average crystal diameter of .08 mm. is obtained and with titanium oxide the average crystal diameter of the sintered mass is .1 mm. Figure III is taken from a photomicrograph (magnification 275X) of such a sintered mass containing 10% of $TiO_2$.

The effect on crystalline development of vanadium oxide sintered with alumina is set forth in the following example.

Example V

When .5% of vanadium oxide is added to 99.5% of finely divided alumina and the mixture sintered as set forth above, crystals of the sintered mass have an average diameter of .007 mm. When the vanadium oxide is used in somewhat greater amounts, as about 1-2%, the average diameter of the crystals in the sintered mass is still smaller—about .001-.002 mm. As increasingly larger amounts of vanadium oxide are used, the crystal size of the mass increases until at a ratio of 8% $V_2O_5$ to 92% $Al_2O_3$ the average crystal size is essentially the same as that of pure sintered alumina. Figure IV is taken from a photomicrograph (magnification 275X) of a sintered product containing 1% vanadium oxide.

Comparison of Figures III and IV with Figure II shows quite graphically the extreme variation in crystal size obtainable by varying the composition of sintered mixes consisting chiefly of alumina.

While we do not wish to be bound thereby, we believe that a possible explanation of these phenomena may be found in the following facts: The trivalent oxides comprising the group which brings about an increase in crystal or grain size of sintered compositions containing alumina will all enter into solid solution in the alumina during the sintering process. On the other hand, the oxides which inhibit the crystal growth of sintered alumina do not, so far as we know, with the exception of vanadium oxide, enter into solid solution in alumina during sintering but rather remain as finely disseminated particles between the alumina grains. It is therefore possible that the oxides of the first mentioned group by entering into solid solution in the alumina tend to promote greater mobility of the alumina molecules thus encouraging the formation of larger crystals. In the case of the oxides of the second group, the interstitial particles between the alumina grains would have a tendency to reduce diffusion or interchange of material between the alumina crystals and therefore inhibit crystal growth.

It is now well recognized that a wide variety of abrasive media is required for the proper grinding, polishing, or other abrasive working of different materials. It has been found that by the method of the present invention alumina may be modified by other oxides to produce a very great range of properties in the alumina grain. The properties affected by the use of these oxides are among others, the microstructure, fracture, toughness, hardness and bonding characteristics.

Abrasive grain may be produced according to the present invention by sintering together finely divided alumina and the proper amount of an oxide which will produce in the alumina the desired characteristics. The sintered mass may be crushed and screened to produce abrasive granules of useful size. Such abrasive grain is applicable to a number of abrasive uses in both bonded and coated abrasives. Furthermore, instead of forming abrasive grain, the sintered product containing alumina modified by the oxides in accordance with our invention may be formed as a shaped article for use as such. Articles having great toughness and wear-resistance may be formed by the method of our invention as may also refractory articles.

Where in the specification or in the appended claims we have referred to the oxides, $Fe_2O_3$, $Mn_2O_3$, $Cr_2O_3$, $Ti_2O_3$ and $V_2O_3$ we have intended these designations to include materials which under the conditions of the process form these oxides or other oxides of the named metals which enter into solid solution in alumina. As pointed out above we may simply admix the finely divided oxides with finely divided alumina and form solid solutions or if it is desired to employ soluble salts of the metals a water solution of the salt may be formed and this solution admixed with the alumina particles to be sintered. When the mixture is dried each alumina particle will be intimately associated with a deposit of the metallic salt or compound.

Where percentages are given in this specification or the claims it will be understood that percentages by weight are meant unless it is otherwise specified.

While we have set forth herein several examples of ways in which our invention may be utilized we do not wish to be limited thereby, but only by the scope of the appended claims.

We claim:

1. As a new article of manufacture, a sintered product consisting principally of crystallized alumina in which at least one oxide of the group consisting of $Fe_2O_3$ and $Mn_2O_3$ is contained in solid solution, said alumina also containing titanium atoms in the lattice thereof.

2. As a new article of manufacture, abrasive grain consisting principally of crystals of sintered alumina in which at least one oxide of the group consisting of $Fe_2O_3$ and $Mn_2O_3$ is contained in solid solution, said alumina also containing titanium atoms in the lattice thereof.

3. The method of producing abrasive granules which comprises mixing together finely divided alumina, titanium dioxide, and at least one oxide of the group consisting of $Fe_2O_3$ and $Mn_2O_3$, forming the mixture into a dense mass and sintering the mass at a temperature in the range from 1700° C. to 2000° C. whereby a solid solution of the oxide in the alumina crystals is produced, and thereafter crushing the sintered mass.

4. An abrasive or wear resistant article comprising granular crystalline sintered alumina in which at least one oxide of the group consisting of $Fe_2O_3$ and $Mn_2O_3$ is in solid solution, and which alumina contains titanium in the lattice thereof, and a bond therefor.

5. As a new article of manufacture, a sintered product composed of crystalline alumina containing titanium atoms in the lattice thereof and $Fe_2O_3$ in solid solution therein, the alumina comprising the major portion of the product.

6. As a new article of manufacture, a sintered product composed of crystalline alumina containing titanium atoms in the lattice thereof and $Mn_2O_3$ in solid solution therein, the alumina comprising the major portion of the product.

7. As a new article of manufacture, abrasive grain consisting principally of crystals of sintered alumina in which $Fe_2O_3$ is contained in solid solution, said alumina also containing titanium atoms in the lattice thereof.

8. As a new article of manufacture, abrasive grain consisting principally of crystals of sintered alumina in which $Mn_2O_3$ is contained in solid solution, said alumina also containing titanium atoms in the lattice thereof.

9. The method of producing abrasive crystals, comprising mixing together finely divided alumina, titanium dioxide, and $Fe_2O_3$, forming the mixture into a dense mass and sintering the mass at a temperature in the range from 1700° C. to 2000° C. whereby a solid solution of the oxide in the alumina crystals is produced, and thereafter crushing the sintered mass.

10. The method of producing abrasive crystals, comprising mixing together finely divided alumina, titanium dioxide, and $Mn_2O_3$ forming the mixture into a dense mass and sintering the mass at a temperature in the range from 1700° C. to 2000° C. whereby a solid solution of the oxide in the alumina crystals is produced, and thereafter crushing the sintered mass.

11. An abrasive or wear resistant article comprising granular crystalline sintered alumina in which $Fe_2O_3$ is in solid solution, and which alumina contains titanium in the lattice thereof, and a bond therefor.

12. An abrasive or wear resistant article comprising granular crystalline sintered alumina in which $Mn_2O_3$ is in solid solution, and which alumina contains titanium in the lattice thereof, and a bond therefor.

HENRY N. BAUMANN, JR.
RAYMOND C. BENNER.